Dec. 31, 1957 W. MEYST 2,817,996

IDENTITY AND DOCUMENT RECORDING APPARATUS

Filed Sept. 17, 1954

INVENTOR.
WILLIAM MEYST
BY
Wm. H. Maxwell Jr.
AGENT.

United States Patent Office 2,817,996
Patented Dec. 31, 1957

2,817,996

IDENTITY AND DOCUMENT RECORDING APPARATUS

William Meyst, Pasadena, Calif., assignor of twenty per-cent to Walter Roeben, Visalia, Calif., and forty per-cent to Roscoe Fagan, Merriam, Kans.

Application September 17, 1954, Serial No. 456,779

2 Claims. (Cl. 88—24)

This invention is concerned with an identity and document recording apparatus and is particularly concerned with the making of a positive record of a person's identity by photographing the fingers of the person. The apparatus of the present invention involves a camera, and the apparatus operates so that a person's hands are easily photographed and recorded simultaneously with the photographing and recording of a written instrument or document associated with the particular person in connection with a transaction, such as a business transaction.

In carrying out business transactions a person's identity must be determined and it is highly desirable that the identity of the person be associated with the written instrument which is the subject of the transaction. It is well recognized that finger prints are a positive and reliable means of identifying a particular person, and with the present invention it is the fingers of the person being identified which are photographed. With the present invention the prints of the person are not distorted by pressing them against transparent elements, such as glass or the like, and inks or stains are not required rendering the apparatus simple to make and easy to operate.

It is a general object of this invention to provide an identifying apparatus which simultaneously records the identity of a person and records the existence of a written instrument, such as a check or the like.

An object of this invention is to provide an apparatus which may be operated without inconveniencing the person being identified. That is, no inks or stains are employed which would render the apparatus and the operation messy and which would require cleaning of the person's fingers.

It is another object of this invention to provide an apparatus of the character referred to which does not require cleaning and in which transparent panels and the like are eliminated. With the apparatus of the present invention blurred or fogged recordings are eliminated since there is no part in the apparatus which can be smeared, such as a transparent piece of glass or the like, which characterize other apparatus of the type under consideration.

It is still another object of this invention to provide means for handling a document or written instrument so that the instrument may be quickly and easily inserted in and carried by the apparatus to be recorded.

Figure 1:
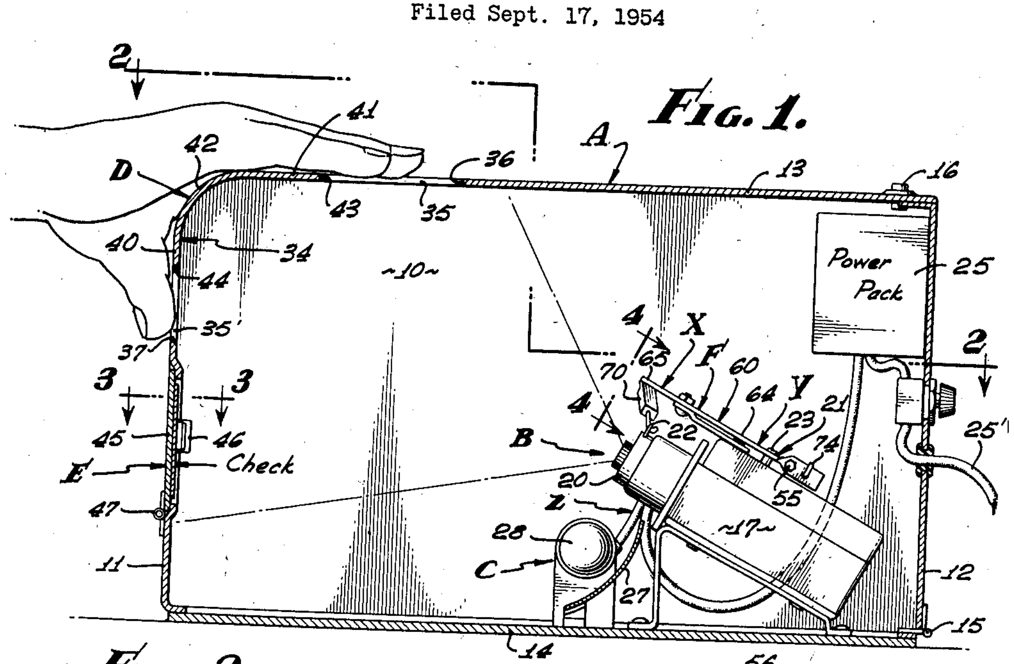
Figure 2:
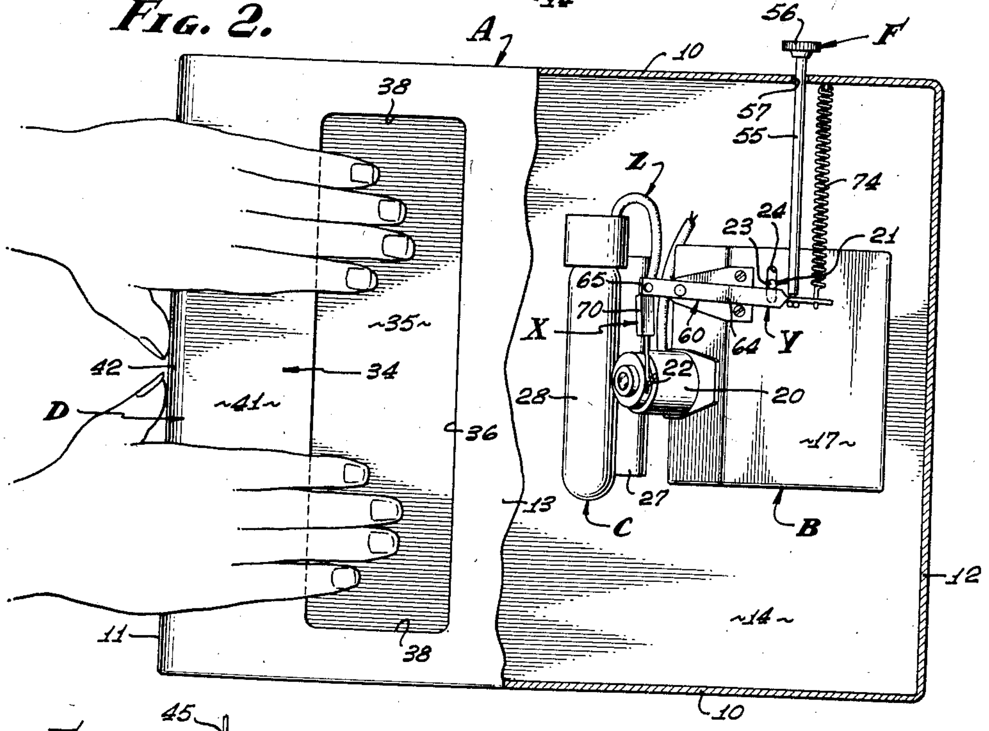
Figure 3:
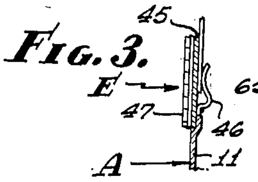
Figure 4:
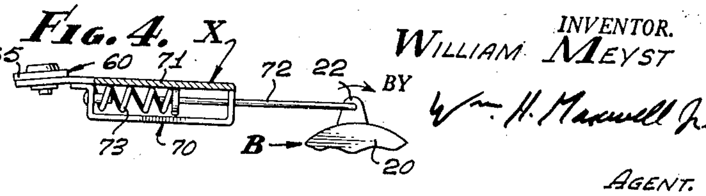

The various objects and features of my invention will be fully understood from the following detailed description of a typical preferred form and application of my invention, throughout which description reference is made to the accompanying drawings, in which:

Fig. 1 is a vertical longitudinal sectional view of the recording apparatus of the present invention, showing the hands of a person applied thereto. Fig. 2 is a view taken as indicated by line 2—2 on Fig. 1 and showing portions of the apparatus in section. Fig. 3 is a detailed view of a portion of the structure taken as indicated by line 3—3 on Fig. 1, and Fig. 4 is an enlarged detailed view of a portion of the structure taken substantially as indicated by line 4—4 on Fig. 1.

The identity and document recording apparatus that I have provided is adapted to record the identity of a person and a document by making a positive and permanent photographic record of the person's hands and of the document. The apparatus of the present invention involves, generally, a housing A that provides a closure for carrying the elements of the apparatus, a camera B, an illuminating means C, a hand positioning means D, a document handling means E and an operating means F which includes a shutter control X, a film advancing means Y and an illumination control Z. The mechanical elements of the apparatus are operated by the means F so that the film carried by the camera B is advanced and exposed, one frame at a time, to record the person's hands positioned by the means D and to record the instrument handled by the means E.

The housing A is a closed rectangular chest-like part forming a chamber that is provided to enclose the working elements of the apparatus and, as shown in the drawings, involves side walls 10, front and rear walls 11 and 12, a top wall 13 and a bottom wall 14, if desired. The rear wall 12 is preferably in the form of a closure or door which is hinged at 15 and which is provided with a lock or fastener at 16. As shown, the panels are simple flat elements of sheet material, such as sheet metal.

The camera B is the recording device of the apparatus and may be a roll film camera adapted to take a series of individual exposures or pictures. The camera B is carried within the chamber of the housing A, preferably at the lower rear portion thereof, and is faced forwardly toward the interior of the housing at the hand positioning means D and document handling means E. The axis of the camera B is, therefore, preferably inclined and directed toward the front of the apparatus where the front 11 and the top 13 merge or come together and form the hand positioning means D as hereinafter described.

The camera B may be an ordinary camera and involves, generally, a case 17 handling a supply of film. The camera includes a suitable lens and shutter mechanism 20, is provided with a film advancing mechanism 21 and a shutter release lever 22. The film advancing mechanism 21 is shown as having an operating pin 23 that projects through a slot 24 in the case 17, which pin is adapted to be engaged and reciprocated to cause operation of the film advancing mechanism 21. The shutter release lever 22 is shown as a simple lever projecting from the lens barrel of the camera and is adapted to be engaged and shifted to cause exposure of the film handled by the camera. It is to be understood that the camera B is complete and includes all other features necessary for exposing and handling a strip of film.

The illuminating means C is the lighting device of the apparatus and is provided to illuminate the forward interior of the chamber formed by the housing A. The illuminating means C is specifically provided to illuminate the means D and E to expose the film when the camera B is operated. The illuminating means C is located in the housing and includes a power source 25, a lamp 28, a reflector 27, and may be controlled by the means Z which is incorporated in the camera B. The power source 25 may be supplied through a suitable power line 25' under control of a switch and, as shown in the drawings, it may include a conventional flash power pack or suitable capacitator connected in the circuit to the lamp 28 so that when the apparatus operates the lamp is momentarily and intensely energized.

As shown in the drawings, the lamp 28 is suitably mounted in the housing at a point laterally offset from the axis of the lens of the camera B and is located a suitable distance from the forward end of the housing, The reflector 27 is provided to direct light in the desired manner and may involve a simple concave panel of suitable sheet material. The forward or concave surface of the reflector may be polished as circumstances require.

The hand positioning means D is in the nature of a support 34 for the hands of a person and is shaped and proportioned to allow the thumbs and fingers of the person to extend or project freely from the said means. The hand positioning means D involves, generally, an opening 35 in the top 13 of the housing and an opening 35' in the front 11 of the housing. The opening 35 is at the forward end portion of the top 13 while the opening 35' is in the upper end portion of the front 11, which openings in effect form a single opening at the upper forward corner of the housing A. The openings 35 and 35' are elongate and extend transversely of the housing and are defined by parallel top and front edges 36 and 37 and by ends 38. The support extends across the openings to be engaged by the hands of a person and is an elongate element or part substantially narrower than the opening formed by the openings 35 and 35' and extends between the ends 38 of the said openings.

The hand support 34 is preferably located at the upper forward corner of the housing A and is characterized by angularly related faces, there being a thumb positioning face 40 and a finger positioning face 41. The faces 40 and 41 are preferably at an angle of 90° to each other and are joined at 42 by a curved portion which forms the upper forward corner of the housing A. As shown, the thumb positioning face 40 extends downwardly in the plane of the front 11 of the housing while the finger positioning face extends rearwardly in the plane of the top 13 of the housing. The hand support 34 has top and bottom edges 43 and 44 which may be parallel with each other, and with the edges 36 and 37. The edges 43 and 44 are substantially spaced from the edges 36 and 37 as clearly shown in the drawings.

It will be apparent from the drawings and from the parts of the apparatus thus far described, that a person may comfortably position the palms of his hands on the support D with the fingers and thumb exposed to the interior of the housing A.

The document handling means is provided to carry an instrument, such as a check or the like, so that it is exposed to the camera B. As shown, the means E involves a carrier 45 and clamps 46 on the carrier adapted to hold the instrument. The carrier 45 is supported in an aperture or window in the front wall 11 of the housing A and is positioned below the opening 35' therein. It is to be understood that the carrier 45 may be placed in other parts of the housing A as desired. As shown, the carrier 45 is pivotally supported from the wall 11 by means of a hinge 47 and is adapted to receive the instrument and hold it faced toward the camera B. When the door formed by the carrier 45 is opened it is a simple matter to apply or remove the instrument by manipulating the clamps 46 which may be spring clips or the like.

The operating means F is an actuating device, is provided to synchronously operate the parts of the camera B and involves, generally, the shutter control X, the film advancing means Y and the illuminating control Z. The shutter control X operates to cause shifting of the shutter release lever 22, the film advancing means Y operates to cause reciprocation of the pin 23, and the illumination control Z operates to cause energization of the lamp 28. The operating means F includes a manually shiftable actuator 55, shown as a shiftable bar having a manually engageable member 56 at the exterior of the housing A. The bar of the actuator 55 extends through an opening 57 in the side 10 of the housing and is slidably supported so that it can be manually depressed when desired.

The film advancing means Y is shown as a lever type mechanism involving a member 60 operated by the actuator 55. The member 60 has an arm 64 that is engaged by the actuator 55, which arm 64 engages the pin 23 so that when the arm is moved the pin 23 is operated to cause operation of the film advancing means 21. As shown, the bell crank 60 has an arm 65 operatively coupled to the lever 22 through a compressible link 70 which includes shiftable parts 71 and 72 as clearly illustrated in Fig. 4 of the drawings. The parts 71 and 72 are yieldingly held extended by a compression spring 73, the part 71 being pivotally connected to the arm 65 while the part 72 is pivotally connected to the lever 22. A main spring 74 is provided to yieldingly return the operating means F to a normal unactuated position.

From the foregoing it will be apparent that I have provided a simple practical mechanism or apparatus for recording a permanent photographic record of a person's fingers together with an instrument, such as a check or the like. The apparatus is easily actuated by manual operation of a single lever or control so that when the actuator 55 is depressed the film is exposed and advanced and so that when the member 55 is released the spring 74 yieldingly returns the operating means F to the normal unactuated position putting the apparatus in readiness for the next succeeding operation.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. A recording apparatus of the character described comprising a box-like housing having a first and a second opening therethrough, a hand support portion on said housing extending between said openings and including a finger positioning face adjacent said first opening and a thumb positioning face perpendicular to said finger positioning face and located adjacent said second opening, and means for supporting a camera in said housing at a location wherein said first and said second openings are within the field of view of a camera supported in said supporting means.

2. A recording apparatus of the character described comprising a box-like housing including a top wall and a front wall, said top wall having a transversely elongated opening therethrough spaced from said front wall and said front wall having a transversely elongated opening therethrough spaced below said top wall, a hand support portion on said housing extending transversely between said openings and including a finger supporting portion adjacent the opening in said top wall and a thumb supporting portion perpendicular to said finger supporting portion and extending downwardly to said opening in said front wall, said supporting portions being proportioned to position a human hand with the ends of the fingers in alignment with the opening in said top wall and the end of the thumb in alignment with the opening in said front wall, and means for supporting a camera within said housing at a location wherein both of said openings are within the field of view of a camera supported in said supporting means.

References Cited in the file of this patent

UNITED STATES PATENTS

| | | |
|---|---|---|
| 2,403,711 | Egan | July 9, 1946 |
| 2,435,099 | Pratt | Jan. 27, 1948 |
| 2,530,758 | Cirone | Nov. 21, 1950 |
| 2,579,961 | Popma | Dec. 25, 1951 |
| 2,730,936 | Fagan | Jan. 17, 1956 |